April 22, 1958     M. TRACHTENBERG     2,832,041
AUTOMATIC SYSTEM FOR DEGAUSSING CONTROL Filed Dec. 31, 1952     3 Sheets-Sheet 1

INVENTOR.
MURRAY TRACHTENBERG
BY George Sipkin
Lee J. Huntzberger
ATTORNEYS

April 22, 1958 M. TRACHTENBERG 2,832,041
AUTOMATIC SYSTEM FOR DEGAUSSING CONTROL
Filed Dec. 31, 1952 3 Sheets-Sheet 2

INVENTOR.
MURRAY TRACHTENBERG
BY George Sipkin
Lee J. Huntzberger
ATTORNEYS

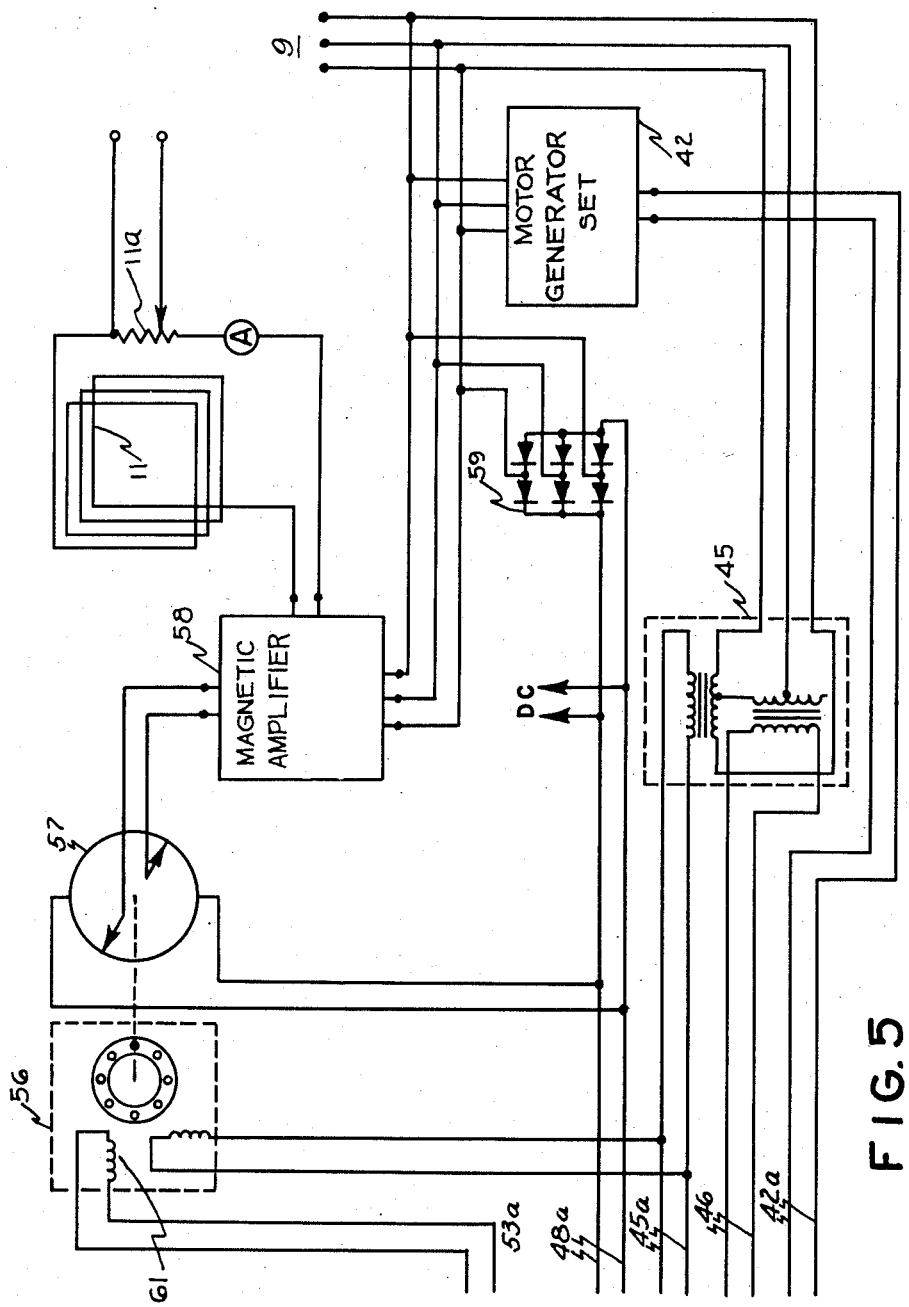

2,832,041

AUTOMATIC SYSTEM FOR DEGAUSSING CONTROL

Murray Trachtenberg, New York, N. Y.

Application December 31, 1952, Serial No. 329,157

6 Claims. (Cl. 324—43)

(Granted under Title 35, U. S. Code (1952), sec. 266)

The invention described herein may be manufactured and used by or for the Government of the United States of America for governmental purposes without the payment of any royalties thereon or therefor.

This invention relates to the control of magnetic fields and more particularly to a system which is capable of automatically and continuously modifying a local field pattern.

In modern warfare magnetically operated weapons such as magnetic mines and torpedoes are in common use. One of the most widely adopted countermeasures employed against these weapons is the shipboard degaussing system. A degaussing system is one preferred use herein described to which the principles of this invention may be applied.

Fundamentally, magnetically operable weapons are provided with a triggering means which is sensitive to local magnetic field changes. A well known effect is employed to operate the triggering means, namely, that as a vessel is propelled from one site to another it produces a considerable change in the magnetic field locally of the vessel. The said change which persists so long as the vessel remains at a location may be sufficient to trigger a magnetically operated explosive.

The field changes locally of a vessel result from a number of factors each of which contribute to disturb or distort the local field pattern. A most important factor is that present day vessels consist for the most part of steel. Their magnetic reluctance is considerably lower than that of air or water. Therefore a greater number of flux lines tend to crowd through the low reluctance path resulting in a substantial change in flux density at the location of the vessel and thereabout over the previously existing field pattern. Then too, the vessel may have its own magnetic field which field is superimposed on the earth's field. This field of the vessel may have any angle with respect to the earth's field and depending upon the vessel's directional orientation may add to, subtract from or otherwise modify the local field pattern of the earth.

Coils of conductors properly distributed about the vessel comprise the essential elements of a degaussing system. The coils serve to overcome the effects of the vessel's presence. Ideally, these degaussing coils completely restore the preexisting field pattern of the earth whereby the effect of the vessel's presence on the sensing mechanism of a magnetically operated explosive is nullified. To determine the coil design necessary the vessel may be ranged. After the coils are installed the required amount of excitation for each can be correctly determined only by ranging.

In ranging, the vessel traverses a course arranged with magnetic measuring instruments distributed about the floor of the course. For example a river floor may be planted with enough magnetometers to obtain the information desired for various conditions of operation. The data obtained when evaluated gives a picture of the vessel's effect on the earth's field. Further comprehensive data may be obtained by checking over the vessel itself using a magnetometer or the like to determine variations of the field intensity thereon. With all the information acquired degaussing coils may be correctly designed and mounted on the vessel.

The categories of degaussing coils more generally used are as follows:

(1) An M or main coil which encircles the vessel in a horizontal plane usually at about the level of the water line and is designed to neutralize vertical magnetic components.

(2) An F or forecastle coil and a Q or quarterdeck coil, the former of which coils encircles approximately the forward one-third of the vessel and the latter of which encircles approximately the after one-third of the vessel; these coils usually are located beneath the upper decks of the forward and after parts of the vessel. The F and Q coils neutralize the effect of the longitudinal components of magnetic field. The F and Q coils may be electrically separate or they may be serially connected.

(3) An L or longitudinal coil which runs with its loops in vertical planes, the axis of the coil being parallel to the longitudinal axis of the vessel for nullifying the portion of the field longitudinal of the vessel. Though the L coil can more accurately simulate the longitudinal component of the field of the vessel, it is not used much except on mine-sweepers or the like due to installation difficulties. Instead the F and Q coils are generally used.

(4) An A or athwartship coil which has its loops in vertical planes running longitudinally of the vessel for neutralizing components transverse to the axis of the vessel in the horizontal plane.

An object of this invention is to provide a magnetic follow-up system.

A further object is to provide a system for reproducing a coexisting magnetic field of another location.

A further object is to provide an apparatus adapted to remove the distortive effect of a particular body on the local magnetic field.

A further object is to provide a system for automatic control of shipboard degaussing currents.

A further object is to provide a system for maintaining correct degaussing currents in any latitude, with any heading, and at any point on the earth which may exhibit a local nonuniformity of magnetic field not normally indicated on charts.

A further object is to provide a shipboard degaussing system employing A. C. magnetometers.

A further object is to provide a degaussing system employing magnetometers for controlling degaussing coil energization.

Other objects and many of the attendant advantages of this invention will be readily appreciated as the same becomes better understood by reference to the following detailed description when considered in connection with the accompanying drawings wherein.

Figure 1:
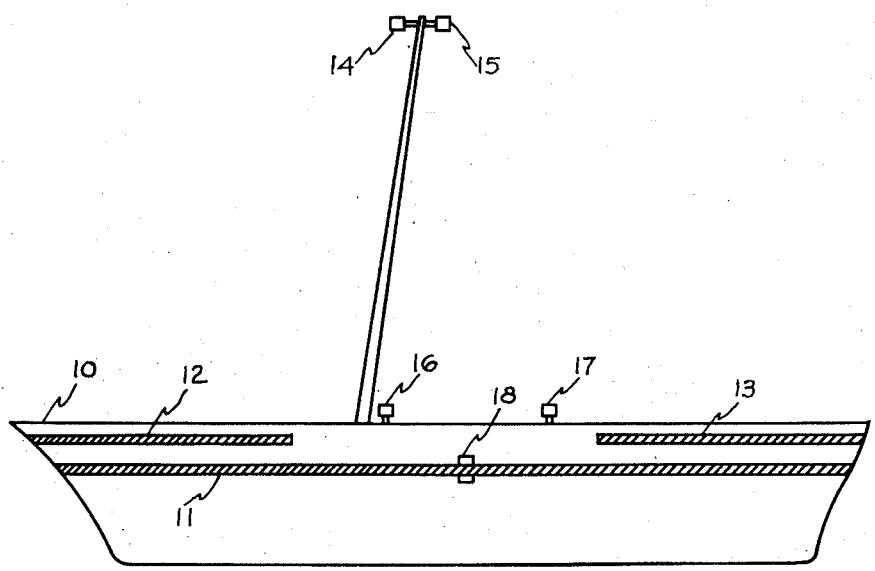
Fig. 1 shows a vessel in outline with the relative location of the magnetometers and degaussing coils indicated thereon.

In Fig. 1 of the drawing a vessel 10, shown in outline, is outfitted with the system constituting this invention. The vessel 10 has a plurality of degaussing coils and magnetometers. For convenience in description the vessel shown is provided with an M or main coil 11, and F or forecastle coil 12, and a Q or quarter deck coil 13, which coils are adapted to fill the vessel's degaussing needs. The vessel 10 is further provided with a plurality of magnetometers 14, 15, 16, 17 and 18 which serve to control the automatic energization of the coils 11, 12 and 13 in the manner subsequently described. The magnetometers 14 and 15 are vertical and horizontal reference magnetometers, respectively, being sensitive only to that respective component of the earth's magnetic field. Likewise each of the magnetometers 16 and 17 are sensitive to the algebraic sum of horizontal components of the earth's field at the magnetometer plus a chosen portion of the horizontal component of the flux linkages of the F coil and Q coil fields respectively. The magnetometer 18 is correspondingly associated with the M coil.

Figure 2:
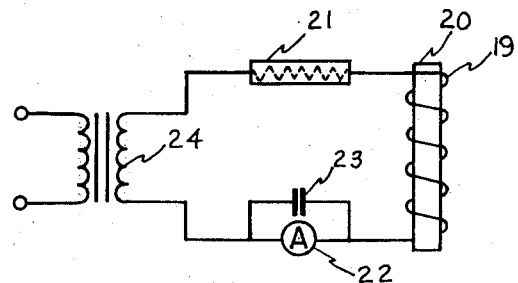
Fig. 2 is a circuit diagram referred to in setting forth the basic operation of one kind of magnetometer.

In order to more completely describe the operation of the system the circuit of Fig. 2 is included as an aid in explaining the basic operation of one type of magnetometer which may be used in the system of this invention. The circuit comprises a coil 19 wound upon a core 20, a non-linear resistor 21 and a parallel combination of an ammeter 22 and a condenser 23 in series with the coil, the combination being connected to an A. C. source 24. The core 20 is made of a material having very high permeability and a relatively low saturation point. If the excitation of the coil is limited to the portion of the magnetization curve below saturation and the core 20 is not linked by any outside magnetic flux lines, the coil functions substantially as a linear inductor. If the coil is operated beyond the linear portion of the saturation curve but the A. C. current supplied is symmetrical and there is no external magnetic field acting on the core, it saturates symmetrically with time. When the core is linked by external flux lines they add to the field generated by the coil in one direction and subtract in the other direction. The core is thereby saturated in one direction and nonsaturated in the other. The reactance of the coil being reduced when the core is saturated does not have the same impedance for both directions of current flow. The result is that more current flows one way than in the other way resulting in a net D. C. flow through the coil. The resistor 21 has an inverse current characteristic and supplements the effect of the coil with the low-saturation-level core. It permits even greater current flow when the current increases in one direction due to decreased impedance. The condenser 23 bypasses substantially all the A. C. The ammeter 22 does not respond to A. C. being sensitive to average current flow. The meter may be calibrated to register flux density directly.

Figure 3:
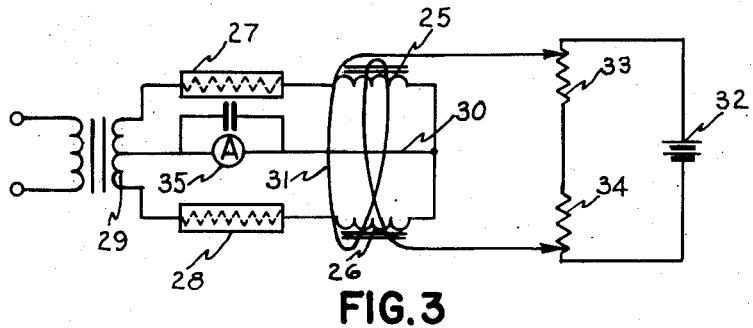
Fig. 3 is a circuit diagram showing an improved version of the basic magnetometer of Fig. 2, and Figs. 4 and 5 are a circuit diagram including some elements in block form of a preferred embodiment of this invention.

The circuit of Fig. 3 is a modified version of the basic circuit shown in Fig. 2. Two wound cores and two non-linear resistors are used in a balanced arrangement where only one of each was used in the circuit of Fig. 2. The coils 25 and 26 are combined in series with the respective resistors 27 and 28, each of the combinations being connected between the center tap and one terminal of the transformer secondary 29. Since the currents through each of the coils 25 and 26 flow through the center lead 30, the A. C. through the condenser will be substantially reduced. However the D. C. components are additive giving substantially a double reading for any particular flux density.

A further advantage of the balanced version of the magnetometer is that a good match of the resistance and unsymmetrical characteristics of the non-linear resistors minimizes error. Also minimized is the unequal effect of an unsymmetrical energizing voltage. In the simple circuit false readings would be obtained under the conditions mentioned.

A coil 31 is arranged to supply a field directed axially of the coils 25 and 26 for neutralizing a coexisting field. The coil 31 is energized from a source 32. A coarse rheostat 33 and a fine rheostat 34 when properly set will permit just enough current flow through coil 31 to produce a null, that is a zero reading on the ammeter 35. Though only one direction of current flow from source 32 through coil 31 is indicated, provision may be made for current reversal. A properly calibrated ammeter in series with coil 31 can be used to register flux density.

Figure 4:
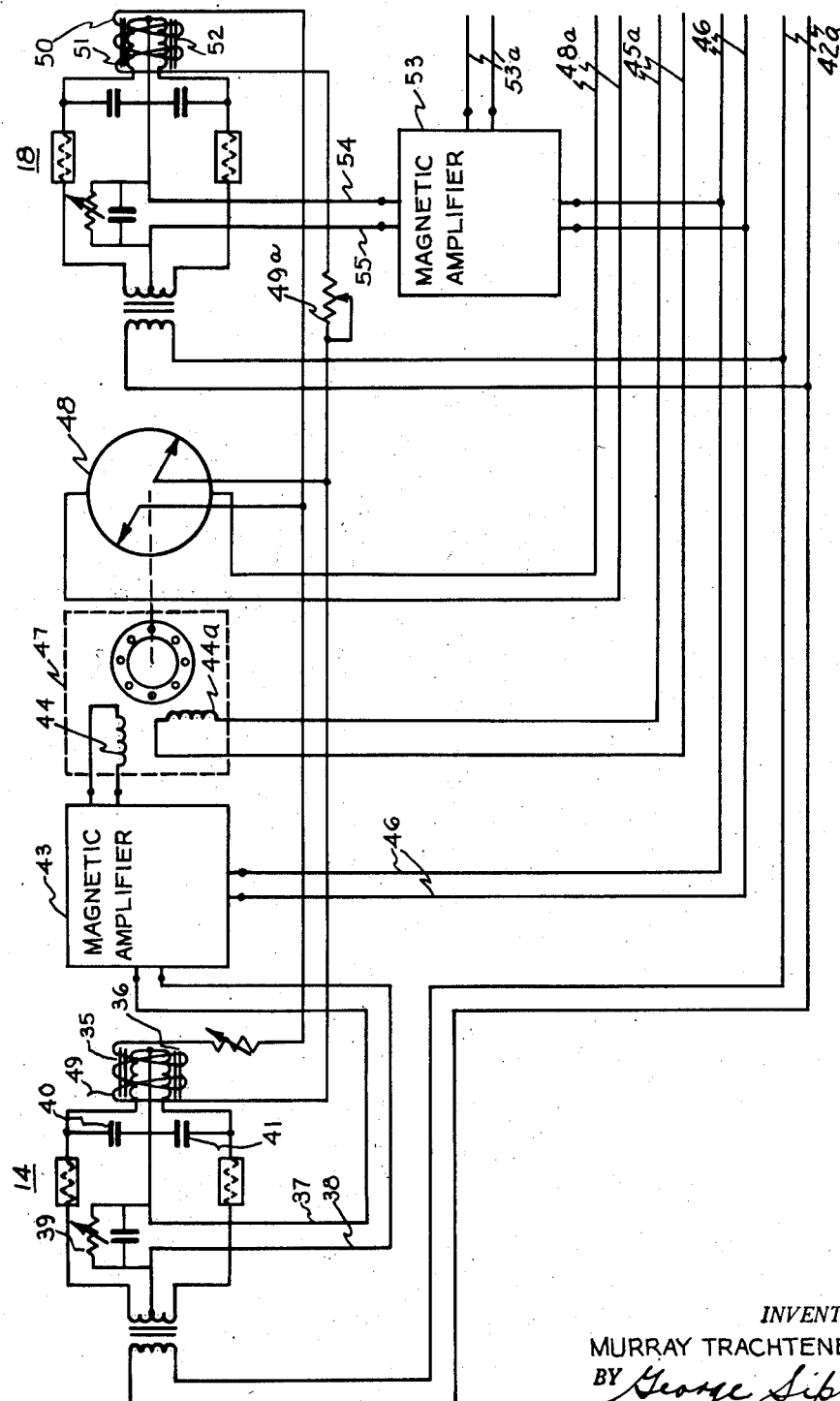

The magnetometers 14 and 18 as shown in Fig. 4 are somewhat modified versions of that shown in Fig. 3. The ammeter is replaced by a pair of output leads 37 and 38. Rheostat 39 may be used to control the output sensitivity. Condensers 40 and 41 are connected across the coils 35 and 36 to limit peaking.

The magnetometer is the key of the degaussing system shown in part in Fig. 4 and Fig. 5. The circuit of Fig. 4 and Fig. 5 serves to control the extent and direction of energization of the M coil 11. A circuit identical with that of Fig. 4 and Fig. 5 is provided for and controls each of the other degaussing coils 12 and 13. In the control circuit the magnetometer is not a measuring instrument but instead generates a signal output that is a function of the particular component of the magnetic field to which it is sensitive. The magnetometer 14 is mounted atop the mast as shown in Fig. 1. The wire wound cores 35 and 36 are aligned with the vertical whereby the magnetometer 14 is sensitive only to the vertical component of the earth's field. Any flux linkages from the M coil 11 that may ordinarily link the magnetometer elements are compensated for through the compensating coil (not shown) mounted adjacent thereto which coil is energized by connection across the M coil resistor 11a. The energization of the compensating coil is always proportional to the energization of M coil 11. Where the roll of the vessel is sufficient to materially disturb the output of any of the magnetometers, a gyro stabilized mounting may be employed. The magnetometer 18 is mounted on the vessel centrally of the M coil whereby it is sensitive to the algebraic sum of the vertical components of the earth's field thereat and a chosen part of the M coil field.

The location of M magnetometer 18 as well as the F and Q magnetometers 16 and 17 is critical. The location of the M magnetometer 18 is so selected that a vertical component of the M coil field is present but substantially zero component from either the F or Q coil field exists at that location. The particular location must be determined through actual magnetic measurements.

The degaussing system is intended to restore the local field pattern of the earth to what it was previous to the presence of the vessel at that location. In order to do so accurately, the preexisting earth's field pattern must necessarily be ascertained at every location. Since it is an impossibility to chart the magnetic field for every square foot of earth's surface, especially so because it varies due to changes in local conditions and since a general outline of the variation of field with latitude is unsatisfactory due to local variations such as peaks or the like, it is necessary to be made cognizant instantly of the preexisting local field pattern at every location as the vessel proceeds. The magnetometers 14, 15 isolated from any effect of the vessel's presence provides this necessary reference information to the degaussing system. Upon receipt of this reference information, the second magnetometer in the control circuit of each degaussing coil varies the energization of its degaussing coil accordingly.

A source 42 supplies the necessary energy to the magnetometers. To reduce the size and weight of the latter, the energy is supplied at a higher frequency. The source 42 may comprise a motor-generator set powered by the vessel's supply 9 and adapted to provide an output at 800 cycles. Electronic means may be substituted.

The magnetometer 14 when energized generates a signal in the form of a D. C. output whose magnitude varies with the strength of the vertical component of the earth's field. This D. C. output is fed into a magnetic amplifier 43 to bias the latter. The bias acts as a valve controlling the power supplied to the servo motor field 44 from source 45 through leads 46. The source 45 is a Scott-T transformer which converts the balanced three phase of the vessel's supply to two single phase supplies 90° apart. One field winding 44a of the two-phase servo motor 47 is continuously fully energized from one phase whereas the field produced by winding 44 varies with the D. C. signal available at leads 37 and 38. Leads 45a supply the current to coil 44a.

The servomotor 47 is coupled to a rheostat 48 through a suitable reducing means (not shown). The rheostat 48 comprises a closed path resistor and pair of symmetrically arranged pickoff fingers whereby it is adapted to supply a reversible output. The input terminals of the rheostat are connected to the output side of the three phase rectifier 59 through leads 48a and a suitable filter (not shown). The rheostat output is fed back to the neutralizing coil 49 of magnetometer 14 and when the coil is sufficiently energized in the proper direction it reduces the output signal of the magnetometer to zero in the manner previously set forth in this description. The servomotor 47 stops rotating because the field 44 is deenergized. The rheostat fingers remain in the new position to which they were rotated.

As explained previously in this description, the ratio of the vertical component of the field intensity at the magnetometer 18 to that beneath the vessel is determined through ranging and other measurements. The resistor 49 is set so that the magnetometer coils 50 and 49a are energized in that ratio.

The energization of coil 50 is proportional to the vertical component of the magnetic field that must be maintained beneath the vessel. When the field created by coil 50 and linking the wound cores 51 and 52 is neutralized by the algebraic sum of the vertical component of the earth's field at the magnetometer 18 and the vertical component of the chosen part of the field of the M coil 11, the signal output of the magnetometer 18 drops to zero. If there is a net field passing through the coils 51 and 52 a corresponding signal output from the magnetometer is supplied as a biasing current to the magnetic amplifier 53 via the leads 54 and 55. The magnetic amplifier 53 supplies the energization current of one of the windings of the servomotor 56 through leads 53a. The rheostat 57 is coupled to the servomotor through a suitable reducing means (not shown), the output of the rheostat being supplied as a bias to the magnetic amplifier 58. The cooperation of the magnetometer 18, the magnetic amplifier 53, the servomotor 56 and the rheostat 57 is the same as described in connection with magnetic amplifier 43, servomotor 47, and rheostat 48. The M coil current is obtained through the magnetic amplifier 58 and varies in accordance with the D. C. bias on the amplifier.

A three-phase full wave rectifier 59 connected to the vessel's supply provides the D. C. to the reversible output rheostats 48 and 57. A filter (not shown) may be included on the output side of rectifier 59 to smooth the ripple.

Though only the control circuit for the M coil 11 has been described it is to be understood that the same control circuit arrangement is needed for each of the other degaussing coils.

In operation a reference magnetometer 14 is secured to an extending part of the vessel as far beyond any magnetic influence of the vessel as is possible. The said magnetometer is arranged to be sensitive to only the vertical component of the earth's magnetic field. A second magnetometer 18 is secured on the vessel closer to the associated degaussing coil 11. The location of the second magnetometer 18 is carefully selected so that it is sensitive to the algebraic sum of the vertical component of the earth's field at the magnetometer and the vertical component of a selected portion of the field of the degaussing coil. The ratio of the field intensity at magnetometer 18 to that beneath the vessel has been ascertained by measurements on the vessel and by ranging.

By taking this ratio into account through resistor 49a, the field intensity beneath the vessel is properly keyed to that at magnetometer 18. Magnetometer 14 generates a signal proportional to the vertical component of the earth's field. The signal is amplified through the action of the magnetic amplifier 43, in circuit with the field 44 of two phase servomotor 47, and the rheostat 48 coupled to the motor. The amplified signal is fed back to magnetometer 14 in a direction to reduce its signal output. When the signal output is reduced to zero the rheostat 48 remains in the corresponding position. The amplified signal available at the rheostat 48 is concurrently supplied to the coil 50 of magnetometer 18 whereby the latter generates a magnetic field intensity at magnetometer 18 of substantially the same amplitude but of opposite direction to the field intensity at magnetometer 14, taking into account the ratio of vertical component of the field intensity at magnetometer 18 to that beneath the vessel. The magnetometer 18 generates a signal whose magnitude is a function of the net vertical magnetic field intensity at magnetometer 18, which is equal to the algebraic sum of the vertical component of the earth's field at the magnetometer, the vertical component of the selected portion of the field of degaussing coil 11 and the field produced by coil 50 the latter being in ascertained relationship to the vertical component of the earth's field at the reference magnetometer 14. By energizing the coil 52 so that the vertical magnetic field intensity generated thereby is substantially equal and opposite to the vertical component of the earth's magnetic field intensity at magnetometer 14, the aforementioned ratio taken into account, and then adding enough vertical magnetic field intensity at magnetometer 18, by means of the degaussing coil 11, so that the resultant vertical magnetic field intensity at magnetometer 18 is equal to zero, the effects of high permeability that is concentration of magnetic flux lines through the vessel are obviated. The magnetometer 18 generates a signal as a function of said summation which signal is amplified through the magnetic amplifier 53 in circuit with field 61 of the two phase servo motor 56, rheostat 57 coupled to the motor 56, and the magnetic amplifier 58. The amplified signal from the magnetic amplifier 58 serves to energize the coil 11 in a direction such that its effect at the magnetometer 18 tends to reduce the signal output to zero. When the energization of coil 11 is changed sufficiently to reduce the signal output of magnetometer 18 to zero and the same has happened for the F and Q coils, the effect of the vessel's presence on the local field pattern of the earth has been minimized.

In the initial adjustment of the system all the amplifiers are adjusted for proper operation. Then with the degaussing system under manual control the vessel is ranged and correct degaussing currents are determined. Following that, the degaussing system is put under automatic control and all magnetometers are adjusted for optimum sensitivity. Finally, the M, F, and Q range resistors are adjusted to provide the M, F, and Q currents found in step No. 2. After initial adjustments are made no further adjustments are required until found necessary by subsequent ranging of the vessel. In normal operation the degaussing system is controlled by only a single "on-off" switch.

Obviously many modifications and variations of the present invention are possible in the light of the above teachings. It is therefore to be understood that within the scope of the appended claims the invention may be practiced otherwise than as specifically described.

I claim:

1. A system for continuously reproducing a magnetic field strength comprising a first and a second magnetic sensing means each adapted to generate a signal proportional to the magnetic field strength in the direction to which they are aligned, said first sensing means mounted in a selected position in a magnetic field, said second sensing means mounted at a spaced location wherein it is desired to reproduce the preselected field strength of the first location, means adapted to modify the field strength at the second sensing means to bring it to the same magnitude as exists at the first sensing means, said first sensing means apprising the second sensing means of the field intensity at the first site through its generated signal, said second sensing means generating a signal proportional to difference between the field strengths, a field producing means controlled through the signal generated by the second magnetic sensing means for modifying the field strength at the second location to bring it to the same magnitude as monitored by the first sensing means at the first location whereby the signal generated by the second sensing means is reduced to zero.

2. A system for use in modifying magnetic fields comprising a first and second magnetically sensitive instrument each of said instruments adapted to produce a signal which is a function of the field strength at the instruments, said first magnetically sensitive instrument positioned in a selected reference field, said second magnetically sensitive instrument positioned at a location wherein it is desired to produce a field strength that is a function of the field strength in the said reference field, coil means constructed and arranged to generate a field that when added to the existing field results in the desired field strength, means linking the two instruments whereby the second instrument is apprised of the strength of the reference field and second means linking the second instrument to the field producing coil whereby the latter generates the field strength necessary to modify the field at the second instrument to bring it to the desired relationship with the field at the first instrument.

3. An automatic magnetic follow-up system comprising a field producing coil, a first magnetometer accurately oriented and fixedly mounted in a reference field, a second identical magnetometer accurately oriented at a second location at which it is desired to reproduce the reference field, both of said magnetometers connected to a suitable power supply and having a neutralizing and a reference coil respectively, said first magnetometer generating a signal that is a function of the reference field strength, a two phase servomotor having two field windings, one of said field windings connected across a constant source, the other of said field windings energized in proportion to the output of the first magnetometer, a rheostat linked to the motor and adapted to be rotated by the motor to a position at which its output corresponds to the reference field strength, said rheostat controlling D. C. voltage fed to the reference coil, said second magnetometer generating a signal which is a function of the sum of the field strengths of the field producing coil, the reference coil, and any other field there existant, a second servomotor and a second rheostat operable in the same manner as the aforementioned members to control the direction and extent of energization of the field producing coil, variations in the generated field of said last-mentioned coil ceasing with zero signal output from the second magnetometer.

4. Apparatus for continuously reproducing a coexisting magnetic field of one location in another location comprising a plurality of magnetic sensing means at said one location adapted to generate a corresponding plurality of signals, each as a function of the field strength in a corresponding plurality of directions, means for amplifying each of the signals, a rheostat for each of the sensing means controlled by said amplified signals, each said rheostat connected to a D. C. supply and passing on a portion of the D. C. supply voltage in proportion to the magnitude of the corresponding signal, a neutralizing coil incorporated in each sensing means energized by said portion of the D. C. voltage to neutralize the flux lines linking the magnetometer whereby the rheostat becomes stationary when the corresponding signal output of the sensing means drops to zero due to complete neutralization of the field component to which the particular sensing means responds, a corresponding plurality of magnetic sensing means at said other location, a coil identical to the neutralizing coil of each of the first mentioned sensing means in each of the second sensing means and energized in direct ratio to the corresponding percentage voltage, a field generating coil associated with each of the latter sensing means and arranged to aid in reproducing said magnetic field and arranged to be energized in proportion to the latter's signal output, each of the latter sensing means adapted to be linked by flux lines of a preselected component of the earth's field corresponding to the directional orientation of the corresponding first sensing means plus a particular portion of the flux lines of the field generating coil and the flux lines of the said coil identical to the neutralizing coil whereby the signal generated by each of the latter sensing means is a function of the sum of the magnetic flux lines linking the said second sensing means.

5. An automatic degaussing system comprising a plurality of degaussing coils adapted to be secured within a vessel for neutralizing the distortive effect of the vessel's presence on the local magnetic field of the earth, each of said coils being adapted to be secured aboard said vessel in a particular orientation for providing a magnetic field having a particular direction and strength whereby the combination of the fields of all the coils effectively neutralizes the said distortive effect, a control circuit for each of the degaussing coils, said control circuit comprising a first magnetometer having a neutralizing coil associated therewith mounted remotely upon a projecting portion of the vessel, a second identical magnetometer having a coil similar to said neutralizing coil mounted in closer relationship to the associated degaussing coil, said first magnetometer being sensitive to that component of the earth's magnetic field adapted to be modified by the field of the said associated degaussing coil, the location of the second magnetometer being carefully selected from adequate magnetic measurements and ancillary data so as to be sensitive to the sum of said same component of the earth's magnetic field thereat and a portion of the field of said degaussing coil, the said magnetic measurement having also provided information as to the ratio of the field strength at the second magnetometer to that beneath the vessel, a high frequency power supply for the magnetometers, said first magnetometer yielding a signal output as a function of the strength of the said component of the earth's field, an amplifier connected to the output of said first magnetometer, a two phase servomotor having one field connected directly to a constant power source and its other field connected to the output of said amplifier, a D. C. power source, a rheostat connected to said D. C. power source adapted to provide a reversible output, said rheostat suitably linked to said servomotor and driven thereby, the said reversible output of the rheostat energizing the said neutralizing coil and the coil of the second magnetometer in a ratio that is in accordance with the ratio determined by magnetic measurements taken of the magnetic field at the location of the second magnetometer and the field beneath the vessel, the second magnetometer adapted to produce an output signal in proportion to the sum of the fields of its coil similar to said neutralizing coil, the associated degaussing coil, and the component of the earth's field to which it is sensitive, a second amplifier, servomotor, and rheostat in circuit with the second magnetometer, a third amplifier in circuit with said second rheostat and arranged to be biased thereby for supplying energizing current to the associated degaussing coil, a compensating coil energized in direct proportion to the energization of said associated degaussing coil for neutralizing the flux linkages of the said degaussing coil at the first magnetometer whereby all the degaussing coils are continuously energized in proper magnitude and direction for neutralizing the distortive effects of the vessel's presence on the local magnetic field.

6. A system for continuously monitoring the magnetic field strength in a particular direction through a first point in a magnetic field and continuously reproducing said magnetic field strength at a second point spaced a substantial distance from said first point and wherein the reproduced magnetic field strength is in a particular direction through said second point, said system comprising: first magnetic sensing and signal generating means having a magnetic axis and generating a signal which is a function of magnetic field strength through said means parallel to the axis thereof, said first means being disposed at said first point and oriented so that its axis is aligned with the direction of magnetic field strength to be monitored, a second magnetic sensing and signal generating means similar to said first means and disposed at said second point and oriented so that its magnetic axis is aligned with the desired direction for the reproduced magnetic field strength, first magnetic field generating means coupled to said first magnetic sensing and signal generating means for generating in response to the signal therefrom a magnetic field strength locally of and in line with the axis of said second magnetic sensing and signal generating means which generated magnetic field strength is equal to the magnetic field strength sensed by said first magnetic sensing and signal generating means but opposite to the desired direction of reproduced magnetic field strength, second magnetic field generating means coupled to said second magnetic sensing and signal generating means for generating continuously in response to the signal therefrom a magnetic field with magnetic field strength in line with the axis of said second magnetic sensing and generating means just sufficient for reducing to zero the signal from said second magnetic sensing and signal generating means.

References Cited in the file of this patent

UNITED STATES PATENTS

| Number | Name | Date |
|---|---|---|
| 1,360,326 | Slepian | Nov. 30, 1920 |
| 2,016,977 | Thomas | Oct. 8, 1935 |
| 2,388,070 | Middel | Oct. 30, 1945 |
| 2,412,617 | Jenkins | Dec. 17, 1946 |
| 2,421,583 | Stuart | June 3, 1947 |
| 2,468,554 | Hull | Apr. 26, 1949 |
| 2,491,736 | Irwin | Dec. 20, 1949 |
| 2,519,395 | Perlow et al. | Aug. 22, 1950 |
| 2,520,677 | Fearon | Aug. 29, 1950 |
| 2,620,381 | Mayes et al. | Dec. 2, 1952 |
| 2,727,206 | Ryerson | Dec. 13, 1955 |
| 2,755,434 | Yetter | July 17, 1956 |